United States Patent [19]

Deschamps et al.

[11] 4,180,550

[45] Dec. 25, 1979

[54] PROCESS FOR PURIFYING A SULFUR DIOXIDE CONTAINING GAS BY WASHING WITH AN AMMONIA AQUEOUS SOLUTION

[75] Inventors: André Deschamps, Noisy le Roi; Sigismond Franckowiak, Rueil-Malmaison; Philippe Renault, Noisy le Roi, all of France

[73] Assignee: Institut Francais du Petrole, Rueil-Malmaison, France

[21] Appl. No.: 835,085

[22] Filed: Sep. 20, 1977

[30] Foreign Application Priority Data

Sep. 20, 1976 [FR] France .................................. 76 28409

[51] Int. Cl.$^2$ ......................... C01B 17/00; C01C 1/02; C01B 17/50
[52] U.S. Cl. ............................... 423/242; 423/541 A; 423/356
[58] Field of Search ............... 423/242, 244, 539, 541, 423/541 A, 356

[56] References Cited

U.S. PATENT DOCUMENTS

| | | | |
|---|---|---|---|
| 3,282,646 | 11/1966 | Bonfield et al. ..................... | 423/541 |
| 3,676,059 | 7/1972 | Welty ................................ | 423/242 |
| 3,695,829 | 10/1972 | Griffin et al. ........................ | 423/242 |
| 3,880,983 | 4/1975 | Welty et al. ......................... | 423/242 |
| 4,036,943 | 7/1977 | Huron et al. ...................... | 423/242 X |

*Primary Examiner*—O. R. Vertiz
*Assistant Examiner*—Gregory A. Heller
*Attorney, Agent, or Firm*—Millen & White

[57] ABSTRACT

Process for purifying a sulfur dioxide containing gas, by washing with an ammonia aqueous solution, comprising the following steps:

(a) contacting a sulfur dioxide containing gas with ammonia and/or ammonium sulfite in the presence of water, to form a solution containing ammonium bisulfite and/or sulfite;

(b) reacting at least a portion of the solution obtained in step (a) with ammonium bisulfate, so as to decompose the ammonium bisulfite and sulfite and to obtain ammonium sulfate as an aqueous solution and gaseous sulfur dioxide;

(c) recovering the sulfur dioxide;

(d) heating the aqueous solution obtained in step (b) for vaporizing at least a portion of the water;

(e) heating the product from step (d) to convert the ammonium sulfate to ammonium bisulfate and gaseous ammonia;

(f) separating the gaseous ammonia obtained in step (e) and feeding it to step (a) either as such or as ammonium sulfite and, (g) feeding to step (b) the ammonium bisulfate obtained in step (e) either as such or after dissolution in water, wherein, in order to avoid an accumulation of ammonium sulfate and/or bisulfate, due the undesirable formation of ammonium sulfate, at least a portion of the ammonium sulfate and/or bisulfate from step (e) is heated with a molybdenum and/or tungsten compound for converting a portion of said ammonium sulfate and/or bisulfate to sulfur dioxide and ammonia, which are fed back to step (a).

14 Claims, 1 Drawing Figure

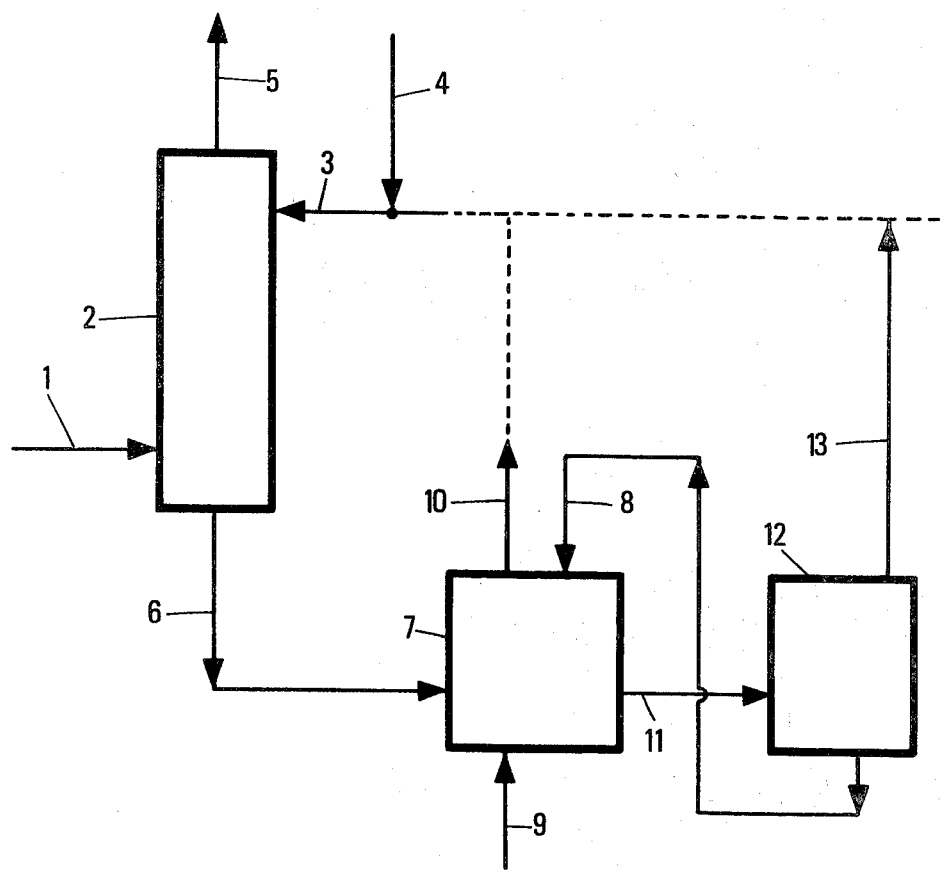

PROCESS FOR PURIFYING A SULFUR DIOXIDE CONTAINING GAS BY WASHING WITH AN AMMONIA AQUEOUS SOLUTION

BACKGROUND OF THE INVENTION

The invention concerns a process for purifying a sulfur dioxide containing gas by washing with an ammonia aqueous solution.

A known process for purifying a sulfur dioxide containing gas comprises (a) contacting the gas with ammonia and/or ammonium sulfite, in the presence of water, to form an ammonium sulfite and/or bisulfite solution, (b) reacting the solution obtained from step (a) with ammonium bisulfate so as to liberate gaseous sulfur dioxide and to form ammonium sulfate in aqueous solution, (c) recovering sulfur dioxide (d) thermally decomposing ammonium sulfate to separately obtain ammonia and ammonium bisulfate, (e) feeding the ammonia to step (a) in the form of ammonia or ammonium sulfite and (f) feeding the ammonium bisulfate to step (b). See for example U.S. Pat. No. 2,405,747.

However, a problem is posed by the accumulation of ammonium sulfate. As a matter of fact, as stated in the U.S. Pat. No. 3,321,275, ammonium sulfate is formed by absorption of $SO_3$, always present in admixture with $SO_2$, during step (a) or by oxidation of the ammonium sulfite solution. This excess sulfate (after conversion to bisulfate) may be decomposed by reduction as proposed in the above mentioned U.S. patent.

This has the disadvantage of consuming a reducing agent and of making it necessary to carry out the thermal decomposition of the ammonium sulfate in a vessel different from that wherein the ammonium bisulfate reduction is performed.

According to another proposition (U.S. Pat. No. 3,676,059), the operation is performed by thermal decomposition at a temperature from 400° C. to 510° C. Unhappily, when using the latter technique, it is observed that the desired reaction:

$$3(NH_4)_2SO_4 \rightarrow 4NH_3 + N_2 + 3SO_2 + 6H_2O \qquad (I)$$

and/or $$3NH_4HSO_4 \rightarrow NH_3 + N_2 + 3SO_2 + 6H_2O \qquad (II)$$

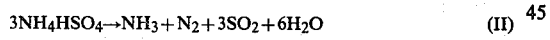

is accompanied with an undesirable decomposition of the ammonium bisulfate (and/or ammonium sulfate):

$$NH_4HSO_4 \rightarrow SO_3 + NH_3 + H_2O \qquad (III)$$

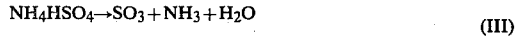

This latter reaction even often prevails over the desired reaction. It has serious disadvantages: $SO_3$ is recycled with ammonia, which increases the corrosion of the ducts. Moreover, this $SO_3$ forms again ammonium sulfate during the cooling step and uselessly consumes a portion of the ammonia available for absorption of $SO_2$, thereby reducing the efficiency of the absorption.

The process described in U.S. Pat. No. 3,695,829, comprising a two steps operation, suffers from the same disadvantages.

SUMMARY OF THE INVENTION

The present invention obviates these disadvantages by providing a process wherein, at equal temperature, the desired reaction of ammonium sulfate or bisulfate conversion to $SO_2$ and $NH_3$ is favoured and the undesirable above-mentioned reaction is strongly inhibited. Moreover, the desired reaction may be conducted at substantially lower temperatures than in the prior process, for an equal conversion rate of the sulfates, which results in a noticable reduction of the corrosion by molten ammonium disulfate and thus facilitates the construction of the plant. The thermal power consumption is also reduced.

The process of the invention is characterized in that the decomposition of the ammonium bisulfate excess is conducted in the presence of a catalyst consisting of a molybdenum or tungsten compound, said reaction being preferably carried out in the vessel wherein is performed the conversion of ammonium sulfate to ammonium bisulfate, although it can also be carried out in a different vessel receiving the effluent from the vessel wherein is performed the conversion of ammonium sulfate to ammonium bisulfate.

The process comprises the following steps:

(a) contacting a sulfur dioxide containing gas with ammonia and/or ammonium sulfite in the presence of water, to form a solution containing ammonium bisulfite and/or sulfite, (b) reacting at least a portion of the solution obtained in step (a) with ammonium bisulfate, so as to decompose the ammonium bisulfite and sulfite and to obtain ammonium sulfate in aqueous solution and gaseous sulfur dioxide, (c) recovering sulfur dioxide, (d) heating the aqueous solution obtained in step (b), to vaporize at least a portion of the water, (e) heating the product from step (d), to convert the ammonium sulfate to ammonium bisulfate and gaseous ammonia, (f) separating the gaseous ammonia obtained in step (e) and feeding this gas to step (a), either as such or as ammonium sulfite, and (g) feeding to step (b) the ammonium bisulfate obtained in step (e), either as such or dissolved in water, characterized in that, in order to avoid an accumulation of ammonium sulfate and/or ammonium bisulfate, due to the undesirable formation of ammonium sulfate, at least a portion of the ammonium sulfate and/or bisulfate from step (e) is heated with a molybdenum and/or tungsten compound, to convert a portion of said ammonium sulfate and/or bisulfate to sulfur dioxide and ammonia.

The above statement refers to the presence in each step of pure salts; in practice, the ammonium sulfite is almost always present with the ammonium bisulfite and conversely, and the ammonium sulfate is almost always present with ammonium bisulfate and conversely.

DETAILED DISCUSSION

Each of the above steps or group of steps may be carried out in the same apparatus or in a series of apparatuses in each of which takes place a part of the operation. For example, steps (b), (c) and (d) or steps (d) and (e) may be carried out practically simultaneously in the same apparatus. Step (e) may be conducted in two successive vessels: in the first vessel where the temperature is moderate, is effected mainly the conversion of ammonium sulfate to ammonium bisulfate with evolution of $NH_3$ and, in the second vessel, where the temperature is higher, are effected mainly the above-mentioned reactions (I) and (II), by use of molybdenum and/or tungsten compounds as catalysts.

The step of decomposing ammonium bisulfate and/or sulfate by contact with the molybdenum and/or tungsten catalyst, constitutes an essential feature of the invention. It is carried out at a temperature from 150° C. to 500° C., preferably from 350° to 440° C. It is possible to proceed at temperatures for which the purely thermal decomposition is normally not substantial, particularly between 350° and 399° C. When step (e) is conducted in two operations, temperatures from 150° to 340° C. are preferred for the conversion of neutral sulfate to hydrogen sulfate and temperatures from 350° to 440° C. (preferably from 350° to 399° C.) for the catalytic decomposition of sulfates.

This decomposition may be performed by adding to a bath of molten ammonium (neutral and/or acid) sulfate from 0.01 to 10% by weight (calculated as metal) of molybdenum and/or tungsten compounds, for example molybdenum and/or tungsten sulfides and/or oxides, molybdates and/or tungstates of metals, for example, alkali metals (e.g. sodium or potassium) or alkaline earth metals, particularly ammonium molybdate and/or tungstate. It is also possible to impregnate a silica carrier or another inert carrier, for example carbon, with one of these compounds, for example ammonium molybdate. The molybdenum and/or tungsten content of the carrier is for example from 0.5 to 50% by weight. The form under which the molybdenum or tungsten compound is introduced seems of little importance since this compound is probably transformed in the sulfate bath to another compound such as a sulfate. There can thus be used a molybdenum or tungsten compound of any valence or even molybdenum metal, when the acidity of the bath is sufficient for dissolving this metal.

The invention is not limited to the use of molybdenum and/or tungsten compounds, as the only catalysts. Associations with other metals have also given satisfactory results, particularly with copper, nickel, cobalt, iron, vanadium and/or manganese compounds.

In practice, the catalyst circulates without inconvenience with the ammonium bisulfate. It is thus recycled to step (b) and remains in the liquid phase during steps (d) and (e).

Step (e) is preferably conducted so that the reaction:

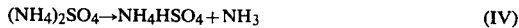

$$(NH_4)_2SO_4 \rightarrow NH_4HSO_4 + NH_3 \qquad (IV)$$

is prevalent and reaction (I) or (II), producing $SO_2$, is minor, and, more preferably, in such a manner that the amount of ammonium hydrogen sulfate produced in reaction IV is substantially equal to that required for the acidification in step (b), the excess (i.e. approximately the amount of sulfate formed by oxidation of the sulfite solution or by absorption of $SO_3$ from the fumes) being decomposed in contact with the catalyst according to reaction (I) or (II), the reaction (III) being very weak.

This adjustement may be obtained by mere modification of the bath temperature; reactions I and II occurring at a higher temperature than reaction IV, a temperature increase will be more favourable to reactions I and II than to reaction IV, particularly above 350° C. Another preferred method for conducting step (e) consists of selecting the temperature so that the amount of ammonium sulfate and/or bisulfate converted to sulfur dioxide and ammonia correspond to the total amount of sulfates formed by $SO_3$ absorption in step (a) and/or sulfites oxidation during the steps of the process.

Most of the steps of the process (with the exception of the use of a catalyst) being known, reference can be made, for their operating conditions, to available publications and, for example, to those above mentioned whose content is incorporated herein by way of reference, to the extent that it contains nothing contrary to the invention. A few additional details are given hereinunder by way of illustration.

Step (a) is carried out at 30°–80° C. and preferably 35°–50° C. The absorption agent is $NH_3$ obtained in step (f): it is used as such in step (a) or after previous dissolution into water or into a portion of the ammonium sulfites solution obtained in step (a) and recycled to the same step. Usually, the apparent $SO_2$ and optionally $SO_3$ absorption agent is thus an aqueous solution of a mixture of ammonium sulfite and bisulfite. At the end of step (a), the ratio bisulfite/sulfite of the solution is increased.

The solution obtained at the end of step (a) contains ammonium sulfite and bisulfite as well as ammonium sulfate and/or bisulfate produced by $SO_3$ of the gas and/or by the sulfites oxidation. The ratio sulfates/sulfites, expressed by the molar ratio $SO_3/SO_2$, is usually from 5 to 15% at the end of step (a).

Step (b) is conducted at a temperature of, for example, 50 to 150° C.

Step (d) is conducted at a temperature of, for example, 100° to 150° C., but the temperature may be much higher, particularly when performing simultaneously operations (d) and (e), or at least a portion of operation (e) concerning the conversion of ammonium sulfate to ammonium bisulfate.

A preferred operating manner for conducting step (e) or both steps (d) and (e) consists of introducing the charge in a mass of molten sulfates at 350°–440° C.

The heating of the decomposer of step (e) may be performed by any convenient means, for example by direct heating by means of a gas burner. A non-oxidizing atmosphere is preferred.

EXAMPLE 1

Referring to the Figure, 13422 $Nm^3/h$ of a fume issued from a sulfuric acid producing plant and containing, as an average:

1550 ppm of $SO_2$ (by volume)
175 ppm of $SO_3$ (by volume)

are introduced through line (1) into an absorption column (2) maintained at about 40° C. while simultaneously supplying, through line (3), an aqueous solution of ammonium sulfite and bisulfite. This absorbing solution is enriched with ammonia so as to maintain the ratio $NH_4 H SO_3/(NH_4)_2SO_3$ close to 2.

The ammonia is added through line (4). In these conditions, the purified fume, which escapes through line (5), contains less than 50 ppm of $SO_2$ and less than 10 ppm of $SO_3$.

Through line 6 there is recovered 0.34 $m^3/h$ of a solution containing:

0.58 kmole/h of $NH_4 H SO_3$
0.27 kmole/h of $(NH_4)_2SO_3$
0.15 kmole/h of $(NH_4)_2SO_4$ In order to obtain a stable absorption rate of the sulfur oxides, the required addition of ammonia amounts to 1.42 kmole/h.

The sulfitic aqueous solution conveyed through line (6) is fed to reactor (7) wherein is also introduced, through line (8), an aqueous solution containing 1.15 kmole/h of $NH_4H SO_4$ whose origin will be explained hereinafter. An acidification reaction of the ammonium sulfites and the formation of $SO_2$ occur within the reactor; the latter, carried along with the air fed through line (9), escapes from line (10) in the gaseous state.

The recovered residual aqueous solution contains:
1.27 kmole/h of $(NH_4)_2 SO_4$
0.03 kmole/h of $NH_4 H SO_4$
and substantially no ammonium sulfites.

It is fed through line (11) to a reactor (12) containing a bath of molten $NH_4 H SO_4$ to which there has been added 1% by weight of molybdenum in the form of ammonium molybdate. This bath is maintained at a temperature of about 378° C. by direct contact with gases issued from a burner.

The gases issuing from reactor (12) through line (13) carry along therewith 0.15 kmole/h of $SO_2$ produced by the ammonium sulfate reduction, 0.18 kmole/h of $SO_3$ and 1.50 kmole/h of $NH_3$.

In a plant operating in a continuous manner, the gases are used for reconstituting the captation absorbing solution which circulates through line (3).

The residual aqueous phase issuing from reactor (12) and containing $NH_4 H SO_4$, is used for feeding reactor (7) through line (8) as above stated.

EXAMPLE 2

The test of example 1 is repeated except that the gases issuing from reactor (12) are recycled through line (13) to the captation column (2) after condensation by cooling.

After operation under running conditions, the material balance of the plant operation is established and it is observed that the purified gas issuing from line (5) contains:
less than 50 ppm of $SO_2$
less than 10 ppm of $SO_3$
less than 20 ppm of $NH_3$
the required ammonia addition, through line (4), amonting to 0.11 kmole/h.

From line (6), there is recovered 0.46 m³/h of an aqueous solution containing:
0.68 kmole/h of $NH_4 H SO_3$
0.32 kmole/h of $(NH_4)_2 SO_3$
0.35 kmole/h of $(NH_4)_2 SO_4$ Reactor (7) is fed through line (8) with an aqueous solution containing 1.35 kmole/h of $NH_4 H SO_4$ and the product issued from line (10) consists of a gaseous effluent containing 1 kmole/h of $SO_2$.

The solution feeding the reactor (12) through line (11) contains:
0.03 kmole/h of $NH_4 H SO_4$
1.87 kmole/h of $(NH_4)_2 SO_4$ The supply of 0.11 kmole/h of $NH_3$ corresponds to the $NH_3$ consumption in reactor (12) where the sulfates are reduced and to the losses due to the entrainment with the purified gases.

EXAMPLE 3 (comparative example)

Example 1 is repeated except that reactor (12) contains no molybdenum. The other conditions remain unchanged. The gases issuing from reactor (12) through line (13) contain:
0.02 kmole/h of $SO_2$
0.4 kmole/h of $SO_3$, and
1.68 kmole/h of $NH_3$ When these gases are fed to the captation column (2), there is formed:
0.4 kmole/h of $(NH_4)_2 SO_4$
0.014 kmole/h of $NH_4 H SO_3$, and
0.006 kmole/h of $(NH_4)_2 SO_3$
whereby only 0.85 kmole/h of $HO NH_4$ remains available for the absorption of $SO_2$.

It is thus observed that the amount of $(NH_4)_2 SO_4$ reduced to $SO_2$ in reactor (12) is lower than the amount of sulfates produced in zone (2) by absorption of free $SO_3$ and by oxidation of ammonium sulfites. In these conditions, it is not possible to proceed in a closed loop, since $NH_4 H SO_4$ would accumulate in reactor (12).

On the other hand, the $SO_3$ amount carried along with the gaseous effluent issued from reactor (12) is higher than in the test of example 1, which results in the lowering of the $NH_3$ amount available for the absorption of sulfur oxides in the captation zone (2).

EXAMPLE 4 (comparative example)

Example 3 is repeated except that the temperature in reactor (12) is maintained at 420° C.

It is observed that the gases escaping from reactor (12) through line (13) carry along therewith:
0.09 kmole of $SO_2$
1.5 kmole of $SO_3$, and
2.8 kmole of $NH_3$ When these gases are fed back to the captation step (2), there is formed:
1.3 kmole of $(NH_4)_2 SO_4$
0.2 kmole of $NH_4 H SO_4$, and
0.09 kmole of $SO_2$ It is observed that the sulfate amount reduced in reactor (12) is still lower than the sulfate amount produced in step (2). Moreover, the $SO_3$ amount carried along with the gases issuing from reactor (12) is such that no more $NH_3$ is available for $SO_2$ absorption in column (2).

Accordingly it is impossible to proceed in a closed loop. It is thus made apparent that, in the absence of catalyst, a temperature increase does not compensate for the disadvantages of the prior technique.

EXAMPLE 5

Example 2 is repeated except that in the sulfate bath contained in reactor (12), molybdenum is replaced by tungsten in the form of ammonium tungstate.

Under steady running conditions, practically the same purification rate of the fume is obtained, but the volume of the bath in reactor (12) tends to increase.

By increasing the bath temperature to about 387° C., it is observed that the level is stabilized. It is thus apparent that the amount of ammonium bisulfate reduced in this reactor becomes, under these conditions, equivalent to the amount of ammonium sulfate produced in the captation zone (2).

What we claim is:

1. In a process for purifying a sulfur dioxide containing gas, by washing with an ammonium aqueous solution, comprising the following steps:
    (a) contacting a sulfur dioxide containing gas with either ammonia or ammonium sulfite or both in the presence of water, to form a solution containing either ammonium bisulfite or ammonium sulfite or both;
    (b) reacting at least a portion of the solution obtained in step (a) with ammonium bisulfite, so as to decompose the ammonium bisulfite and sulfite and to obtain ammonium sulfate as an aqueous solution and gaseous sulfur dioxide;

(c) recovering the sulfur dioxide;

(d) heating the aqueous solution obtained in step (b) for vaporizing at least a portion of the water;

(e) heating the product from step (d) to convert the ammonium sulfate to ammonium bisulfate and gaseous ammonia;

(f) separating the gaseous ammonia obtained in step (e) and feeding it to step (a) either as such or as ammonium sulfite; and (g) feeding to step (b) the ammonium bisulfate obtained in step (e) either as such or after dissolution in water;

the improvement which comprises heating at least a portion of either the ammonium sulfate or the ammonium bisulfate or both from step (e) with a catalytic quantity of either a molybdenum compound or a tungsten compound or a mixture thereof which favors the decomposition of said portion of either said ammonium sulfate or said bisulfate or both to sulfur dioxide and ammonia while strongly inhibiting the decomposition reaction resulting in sulfur trioxide, thereby avoiding an undesirable accumulation of either sulfate or bisulfate.

2. A process according to claim 1 wherein step (e) is conducted in two stages: a first stage (e.1) of converting ammonium sulfate to ammonium bisulfate and a second stage (e.2) conducted at higher temperature for partially converting ammonium bisulfate to sulfur dioxide and ammonia in the presence of either said molybdenum compound or said tungsten compound or said mixture thereof.

3. A process according to claim 2, wherein the temperature of stage (e.1) is from 150° to 340° C. and the temperature of stage (e.2) from 350° to 440° C.

4. A process according to claim 1, wherein the catalytic decomposition is conducted at from 350° to 399° C.

5. A process according to claim 1, wherein either said molybdenum compound or said tungsten compound or said mixture thereof amounts to 0.01 to 10% (in metal weight) of the weight of ammonium sulfates from step (e).

6. A process according to claim 1, wherein said molybdenum compound is at least one compound selected from the group consisting of the oxide, the sulfide, the molybdate of an alkaline or alkaline-earth metal and ammonium molybdate.

7. A process according to claim 1 wherein step (e) is conducted so as to decompose to $SO_2$ an amount of either said ammonium sulfate or said ammonium bisulfate or both substantially equal to the amount of the sulfates formed by oxidation of the sulfite solution of step (a) and by absorption of sulfur trioxide when present in the sulfur dioxide containing gas.

8. A process according to claim 1, wherein the sulfur dioxide and ammonia obtained by conversion of said portion of either said ammonium sulfate or said ammonium bisulfate or both with either said molybdenum compound or said tungsten compound or said mixture thereof are fed back to step (a).

9. A process according to claim 1, wherein said heating of at least a portion of either said ammonium sulfate or said ammonium bisulfate or both with either said molybdenum compound or said tungsten compound or said mixture thereof is conducted at a temperature at which the purely thermal decomposition of either said ammonium sulfate or said ammonium bisulfate or both is not substantial.

10. A process according to claim 9, wherein said temperature is 350°–399° C.

11. A process according to claim 1, wherein said tungsten compound is at least one compound selected from the group consisting of the oxide, the sulfide, the tungstate of an alkaline or alkaline-earth metal and ammonium tungstate.

12. A process according to claim 6, wherein said molybdenum compound is ammonium molybdate.

13. A process according to claim 11, wherein said tungsten compound is ammonium tungstate.

14. A process according to claim 1, wherein said heating of said portion of either the ammonium sulfate or ammonium bisulfate or both is substantially effected by passing hot gas from a burner in direct contact with said portion.

* * * * *